S. J. JONES.
WINDOW CLEANER.
APPLICATION FILED SEPT. 11, 1912.

1,065,812.

Patented June 24, 1913.

Witnesses
W. S. McDowell
James A. Koehl

Inventor
Sherman J. Jones
By Victor J. Evans
Attorney

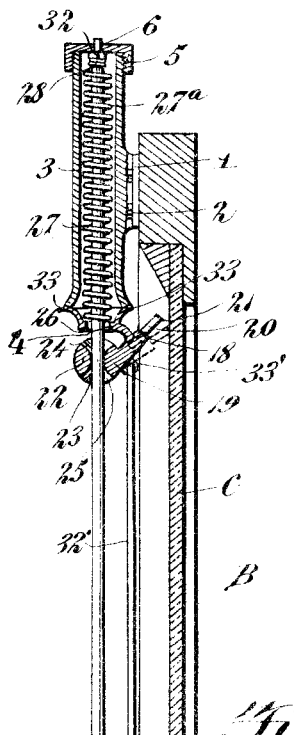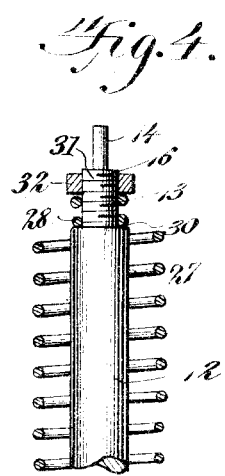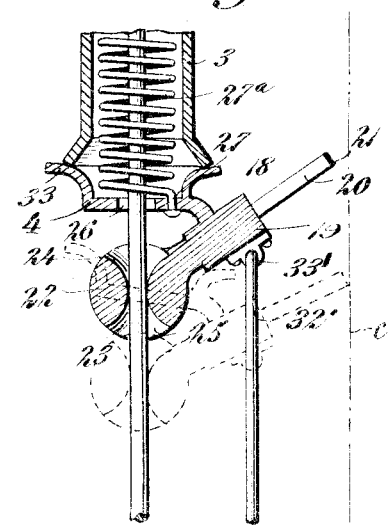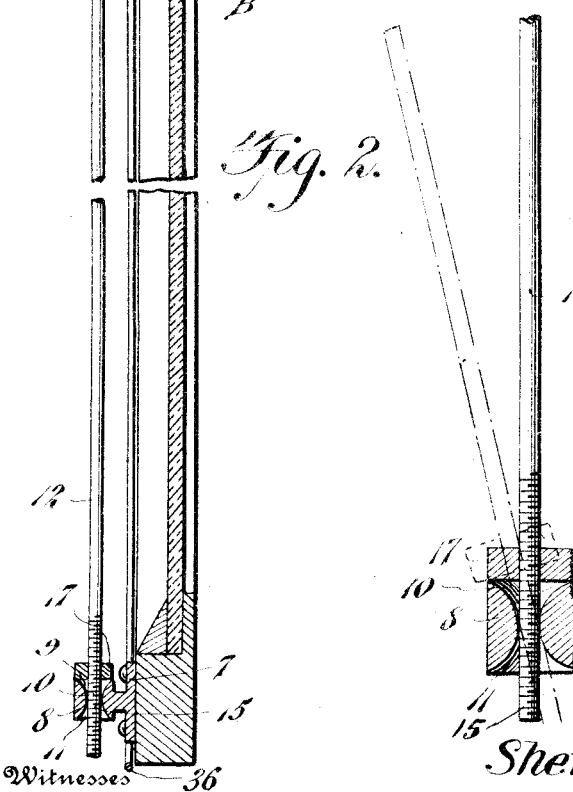

UNITED STATES PATENT OFFICE.

SHERMAN J. JONES, OF CHICAGO, ILLINOIS.

WINDOW-CLEANER.

1,065,812.  Specification of Letters Patent.  Patented June 24, 1913.

Application filed September 11, 1912. Serial No. 719,849.

*To all whom it may concern:*

Be it known that I, SHERMAN J. JONES, a citizen of the United States, residing at Chicago, in the county of Cook and State of Illinois, have invented new and useful Improvements in Window-Cleaners, of which the following is a specification.

This invention relates to window cleaning devices for carriers such as automobiles;
and has for an object to provide a cleaning device which may be mounted upon the window of the carrier and operable thereon whereby the driver's view portion of the window may be relieved of snow, sleet, or view obstructing elements when the machine is traveling in inclement weather.

Another object of the invention is to provide means for automatically restoring the squeegee to an operative position above the view portion of the window and for moving the squeegee with relation to said view portion.

A still further object of the invention is to provide means for cushioning the return of the squeegee so as to prevent accidental derangement of the companion parts of the structure through impact thereof with the spring casings.

Another object of the invention is to provide means for mounting the squeegee guide rods whereby they may be readily connected with or disconnected from the window as the occasion may demand.

With these and other objects in view, the invention consists of certain novel features, of construction, combination and arrangement of parts, as will be hereinafter described and claimed.

In the accompanying drawings:—Figure 1 is a perspective view of a portion of an automobile dashboard, showing the application of the window cleaning attachment thereto; Fig. 2 is a vertical section through the window and through a portion of the cleaning attachment and indicating in full lines the disengaged position of the squeegee and in dotted lines the scraping and cleaning position of the squeegee; Fig. 3 is a perspective view of the squeegee; Fig. 4 is a side view of a portion of one of the guide rods, showing the manner of connecting the spring thereto; Fig. 5 is a section on an enlarged scale through the squeegee, showing the application thereof to the guide rods and illustrating the different adjusted positions of the wiping surface of the squeegee; and Fig. 6 is a section through a portion of the window, showing the rod supporting bracket thereon and illustrating in dotted lines a position of the guide rod to permit it to be disconnected from the window.

An automobile dashboard A, conventionally shown herein, is provided with a windshield or window B wherein is included a transparent pane or view portion C, preferably of glass.

The cleaning attachment comprises brackets 1, which are secured through the medium of screw fastenings 2 to the sides of the frame of the window B and disposed preferably at the upper corners of the view portion C. Vertical casings 3 on the brackets 1 are disposed adjacent to the vertical edges of the view portion C and as shown each casing is provided with an open lower end 4 and a closed upper end 5, the latter having a centrally arranged vertical opening 6 therein for a purpose to be hereinafter described. Brackets 7 are secured to the frame of the window B and disposed directly beneath the first-named brackets 1. The brackets 7 are provided with extensions 8, which are disposed in axial alinement with the openings 6 in the heads 5 of the casings 3. Each of said extensions has formed therein an opening 9 having walls 10, which are flared upwardly and outwardly and walls 11, which are flared downwardly and outwardly.

Vertical guide rods 12 are provided with upper reduced portions 13 and 14 and lower threaded portions 15. The portions 15 extend through the vertical openings 9 in the brackets 7, while the reduced portions 14 extend into the vertical openings 6 in the heads 5. Shoulders 16 are formed on the rods incident to the arrangement of the companion reduced portions 13 and 14 and as illustrated these shoulders are designed to bear against the under sides of the heads 5. In this manner the rods 12 are held against passing entirely through the heads, as is understood. The threaded portions 15 of the guide rods 12 accommodate adjusting and stop nuts 17, which are adapted to bear against the extensions 8 of the lower brackets 7, whereby the rods 12 may be adjusted vertically to insure the proper engagement of the shoulders 16 against the heads 5. The nuts 17 also form stops to hold the guide rods 12 against dropping through the brackets 7.

A squeegee 18 is mounted to slide vertically on the companion guide rods 12, and, as illustrated, it comprises a head 19, to which is secured a cleaning strip 20 of elastic material. This strip is preferably coextensive in length with the view portion C of the window, so that the latter may be cleaned throughout when the surface 21 of the strip 20 is brought into direct sliding contact therewith. The head 19 is provided with substantially spherical guides 22, which are apertured at 23 to receive the rods 12. Said passages have walls 24, which are flared upwardly and outwardly and walls 25, which are flared downwardly and outwardly, whereby the squeegee is mounted for movement with relation to the view portion C of the window. Forked integral portions 26 of the head 19 receive the rods 12 in such manner as will accommodate rocking adjustments of the squeegee. These portions of the head have the lower ends of retractile springs 27 secured thereto. The springs have relatively large convolutions 27ª, which embrace portions of the rods 12 within the casings 3 and upper relatively restricted convolutions 28, which embrace the reduced portions 13 of said rods. The lowermost convolution of each portion 28 bears against a shoulder 30 of its guide rod, and, as shown, the portion 13 of the rod is threaded at 31 to accommodate a clamping nut 32. This nut is adapted to be adjusted against the uppermost convolution of the portion 28, so that the upper part of the spring is securely confined between the clamping nut 32 and the shoulder 30. Spring buffers 33 on the forked portions 26 of the squeegee head are designed to engage against the lower ends of the casings 3, so as to cushion the squeegee on its return to its initial position. The buffer springs are desirable in that the sudden shock is eliminated between the casings 3 and the squeegee, and as a consequence the different parts of the structure are held against accidental derangement. With a view to employing manually controlled means for moving the squeegee vertically, and for also tilting the same so as to insure the cleaning contact of the strip 20 with the view portion C, I employ a rod 32', which has connection at 33' with the squeegee head. At 34, the rod extends through a guide 35 and then horizontally along the window, as at 36, beneath the view portion C and then upwardly, as at 37, adjacent to one end of this view portion C where it is terminally equipped with a controlling handle 38. This handle may be disposed within convenient reach of the operator of the machine, whereby it may be manually depressed to thereby cause cleaning movements to be imparted to the squeegee head and to also force the strip 20 of the head into cleaning contact with the portion C.

The openings 9 as formed in the brackets 8 are such that the nuts 17 may be adjusted on the rods 12, whereby the portions 6 of the latter may be withdrawn from the centrally disposed openings in the heads 5. The rods 12 are then drawn downwardly until their upper portions are disposed slightly below the plane of the lower ends of the casings 3. Now, the rods may be tilted and then drawn upwardly, so that both the rods and the cleaning head of the structure and the springs 27 may be removed at one time should such be desirable for the purpose of facilitating the repair of any of the parts.

Having thus described my invention, what I claim is:

1. A window cleaner comprising, casings adapted to be mounted upon the window at points adjacent to the upper corners of the transparent panel thereof, brackets adapted to be secured to the window at points below the edge of the transparent panel and in axial alinement with said casings, guide rods adjustably mounted between the casings and brackets, a rocking squeegee slidably mounted upon the rods, and means in the casings for yieldingly sustaining the squeegee in one position.

2. A window cleaner comprising, casings adapted to be mounted upon the window at points adjacent to the upper corners of the transparent panel thereof, brackets adapted to be secured to the window at points below the edge of the transparent panel and in axial alinement with said casings, guide rods adjustably mounted between the casings and brackets, a rocking squeegee slidably mounted upon the rods, means in the casings for yieldingly sustaining the squeegee in one position, and a buffer carried by the squeegee and adapted to contact with the casings.

3. A window cleaner comprising casings adapted to be secured to the window at points adjacent to the upper corners of the transparent panel thereof, said casings having open lower ends and upper ends provided with heads, the head of each casing having a central opening therein, brackets adapted to be secured to the window and disposed below the edge of the casings and arranged in axial alinement therewith, rods having other portions fitting in the brackets and having portions extending into the casings and formed with reduced ends extending into the central openings of said heads, a rocking squeegee slidably mounted on the rods, means for sustaining the squeegee in one position and for rocking the same in one direction, and means for imparting sliding movement to the squeegee and for rocking the same in another direction.

4. A window cleaner comprising, casings adapted to be secured to the window at points adjacent to the upper corners of the transparent panel thereof, brackets adapted to be secured to the window in alinement with the casings, rods connecting the brackets with the casings, a squeegee mounted for rocking and sliding movements respectively on the rods, springs embracing the rods and having their lower portions secured to the squeegee, shoulders formed on the rods within the casings, the said springs having upper reduced convolutions surrounding the upper ends of the rods, and adjustable means on the rods bearing against the said reduced convolutions and confining the same against said shoulders.

5. A window cleaner comprising casings adapted to be secured to the window at points adjacent to the upper corners of the transparent panel thereof, brackets adapted to be secured to the window in line with the casings, rods having upper portions connected with the casings and having lower portions extending through the brackets, the brackets having openings therein accommodating the lower portions of the rods whereby the latter may be rocked with relation to the window, and a squeegee adjustable longitudinally on the rods and adapted for rocking movement with relation to the transparent panel of the window.

In testimony whereof I affix my signature in presence of two witnesses.

SHERMAN J. JONES.

Witnesses:
  J. L. Patton,
  Will N. Johnson.